United States Patent
Ono et al.

(10) Patent No.: US 6,709,347 B1
(45) Date of Patent: Mar. 23, 2004

(54) SPORTING ROD MEMBER USING SOLID ROAD

(75) Inventors: Hiroyuki Ono, Kanagawa (JP); Atsushi Saito, Tokyo (JP); Isao Ohta, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 427 days.

(21) Appl. No.: 09/359,752

(22) Filed: Jul. 23, 1999

(30) Foreign Application Priority Data

Jul. 24, 1998 (JP) .......................................... 10-225395

(51) Int. Cl.$^7$ .............................................. A63B 53/10
(52) U.S. Cl. ...................... 473/319; 473/536; 280/819; 43/18.5
(58) Field of Search ................................ 473/320, 319, 473/318, 321, 535, 536; 273/80 B; 43/18.1, 18.5; 280/819

(56) References Cited

U.S. PATENT DOCUMENTS

| RE16,118 E | * | 7/1925 | Cosby | .................... | 473/319 |
| 3,974,012 A | * | 8/1976 | Hogarth | ...................... | 156/161 |
| 5,427,373 A | * | 6/1995 | Kusumoto | ................... | 473/319 |
| 5,865,684 A | * | 2/1999 | Herber | ........................ | 473/201 |
| 5,968,621 A | * | 10/1999 | Okada | ........................ | 428/363 |

* cited by examiner

*Primary Examiner*—Stephen Blau
(74) *Attorney, Agent, or Firm*—Liniak, Berenato & White

(57) ABSTRACT

A sporting rod member which is strong against flexure, which is improved in tough and balance when it is flexed, and which can be made finer in thickness and lighter in weight. The sporting rod member uses a solid rod (8). The solid rod (8) is made up of a solid-state core member (10) and an outer layer (12) formed of fiber reinforced resin and disposed on the outside of the core member (10). In the solid rod (8), most of reinforcing fibers that are used in at least one of the solid-state core member and outer layer and that extend substantially in the axial direction thereof have a longitudinal elastic modulus of 40 ton/mm$^2$ or higher.

22 Claims, 6 Drawing Sheets

(d)

(c)

SPORTING ROD MEMBER USING SOLID ROAD

BACKGROUND OF THE INVENTION

1. Field of the Invention

The present invention relates to a sporting rod member using a solid rod and, in particular, to a rod member to be used for sporting goods such as a fishing rod, the shaft of a golf club, the shafts of badminton and tennis rackets, the shaft of a ski pole and the like.

2. Description of the Related Prior Art

As a rod member for use in sporting goods such as a fishing rod and the like, there is used a hollow-rod or hollow-pipe member which is formed of fiber reinforced resin because it is light in weight and high in strength. Referring to the fishing rod, the tip rod portion thereof may be sometimes formed of a solid rod but, in the remaining rod portions thereof, there is used a hollow pipe.

However, because the sporting rod member is used in the sporting goods, in actual use, strong flexure loads are applied to the sporting rod member and, therefore, an improvement in the strength of the sporting rod member is always an elementary proposition in the sporting rod member. That is, users always demand from the sporting rod member in various manners: for example, the sporting rod member must be more resistant against flexure, must be enhanced in the sense of use and in the sense of operation (such as the sense of toughness and sense of balance) when it is flexed, must be finer in thickness, must be reduced in weight, and so on.

SUMMARY OF THE INVENTION

The present invention aims at meeting the above-mentioned demands of the users. Accordingly, it is an object of the invention to provide a sporting rod member which is improved in the properties thereof to thereby be able to meet such demands.

In attaining the above object, the invention provides, as a first aspect, a sporting rod member using a solid rod, the solid rod comprising a solid-state core member and an outer layer that is formed of fiber reinforced resin and that is disposed on the outside of the core member, wherein most of reinforcing fibers used in at least one of the solid-state core member or outer layer and extending substantially in the axial direction thereof have a longitudinal elastic modulus of 40 ton/mm$^2$ or higher. The term "most" in the first aspect means 60% or more, preferably, 70% or more, more preferably, 80% or more.

In a second aspect, there is provided a sporting rod member using a solid rod, the solid rod comprising a solid-state core member formed of fiber reinforced resin and an outer layer formed of fiber reinforced resin and disposed on the outside of the core member, wherein the average longitudinal elastic modulus of the reinforcing fibers of the core member substantially extending in the axial direction thereof varies in two or more stages in the axial direction thereof.

In a third aspect, the sporting rod member using the solid rod as set forth in the second aspect is featured in that the average longitudinal modulus is higher on the base end side thereof than on the leading end side thereof.

In a fourth aspect, there is provided a sporting rod member using a solid rod, the solid rod comprising a solid-state core member and an outer layer that is formed of fiber reinforced resin and that is disposed on the outside of the core member, wherein a hollow pipe member is formed integrally with the leading end portion of the solid rod.

In a fifth aspect, there is provided the sporting rod member using the solid rod as set forth in any one of first to fifth aspects, wherein the outer layer includes a woven cloth, an inclined-direction extending fiber, or a circumferential-direction extending fiber.

In a sixth aspect, there is provided the sporting rod member using the solid rod as set forth in any one of first to fifth aspects, wherein, as the outer layer, or on the outside of the outer layer, there is disposed a transparent or translucent fiber reinforced resin layer.

In the first aspect, since the reinforcing fibers having a longitudinal elastic modulus of substantially 40 ton/mm$^2$ or higher are mainly used as the axially extending fibers, when compared with a case where fibers having a small longitudinal elastic modulus are used, desired flexure rigidity can be secured with a less fiber amount, the solid rod area of the sporting rod member can be made finer in thickness, and, when flexed, the sporting rod member is prevented against crush, thereby being able to enhance the strength of the sporting rod member. If the fiber reinforced resin solid-state core member is previously molded and the surface thereof is previously treated by grinding or by a similar working operation, then the reinforcing fibers are cut and the strength of the core member is lowered accordingly. However, if a prepreg is wound on the outer periphery of the thus treated core member and they are then molded by heating, then there can be provided a solid rod in which the lowered strength of the solid-state core member is reinforced.

According to the invention as set forth in the second aspect, in the solid rod comprising a solid-state core member formed of fiber reinforced resin and an outer layer formed of fiber reinforced resin and disposed on the outside of the core member, since the average longitudinal elastic modulus of the reinforcing fibers of the core member substantially extending in the axial direction thereof varies in two or more stages in the axial direction thereof, the flexure rigidity of the solid rod can be adjusted due to the longitudinal elastic modulus, which makes it possible for the sporting rod member to obtain a desired sense of operation (such as the senses of toughness and balance).

In the third aspect, since the average longitudinal elastic modulus is higher on the base end side thereof than on the leading end side thereof, the flexure rigidity on the base end side thereof is higher. Therefore, there can be provided a rod member which is easy to use in sporting goods such as a fishing rod, the shaft of a golf club, the shafts of badminton and tennis rackets, ski pole and the like.

In the fourth aspect, because the hollow pipe member is formed integrally with the leading end portion of the solid rod, when carrying the rod member by hand on the opposite side of the hollow pipe member, there can be eliminated a sense of heavy weight in carriage, thereby being able to enhance the sense of light weight of the rod member. This advantage can be found especially in a long rod member such as a fishing rod.

In the fifth aspect, since the outer layer includes a woven cloth, an inclined-direction extending fiber, or a circumferential-direction extending fiber, the solid rod can be prevented against tear on the surface thereof, or the strength of the solid rod can be enhanced with respect to a torsional load.

In the sixth aspect, because, on the outer periphery of the solid rod, there is disposed a transparent or translucent fiber reinforced resin layer, if a pattern is drawn on the back side of the present resin layer, then the pattern can be recognized visually and can also be protected; and, the appearance of the solid rod can be made deep depending on the thickness of the present resin layer. Further, the present layer can also reinforce the flexure strength of the solid rod.

The present disclosure relates to the subject matter contained in Japanese patent application No. Hei. 10-225395 (filed on Jul. 24, 1998), which is expressly incorporated herein by reference in its entirety.

DESCRIPTION OF THE PREFERRED EMBODIMENT

Now, description will be given below in more detail of the preferred embodiments of a sporting rod member according to the invention with reference to the accompanying drawings.

Figure 1:
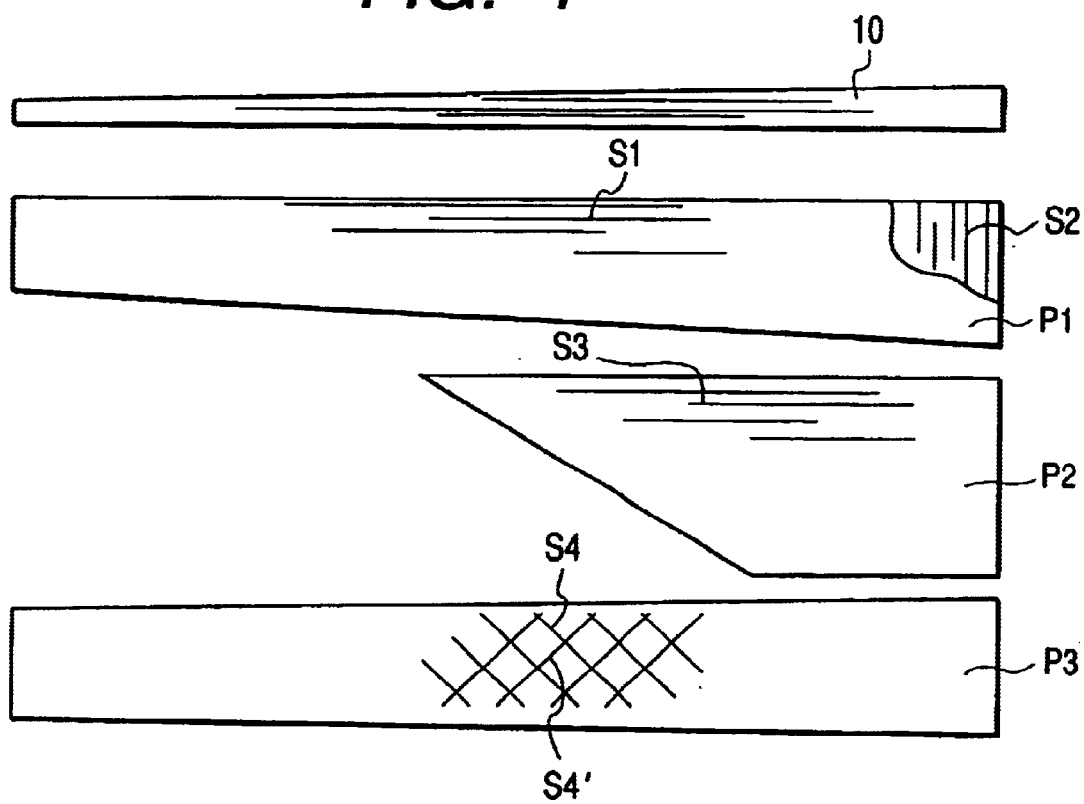
FIG. 1 is an explanatory view of a method for manufacturing a sporting rod member according to the invention.
Figure 2:
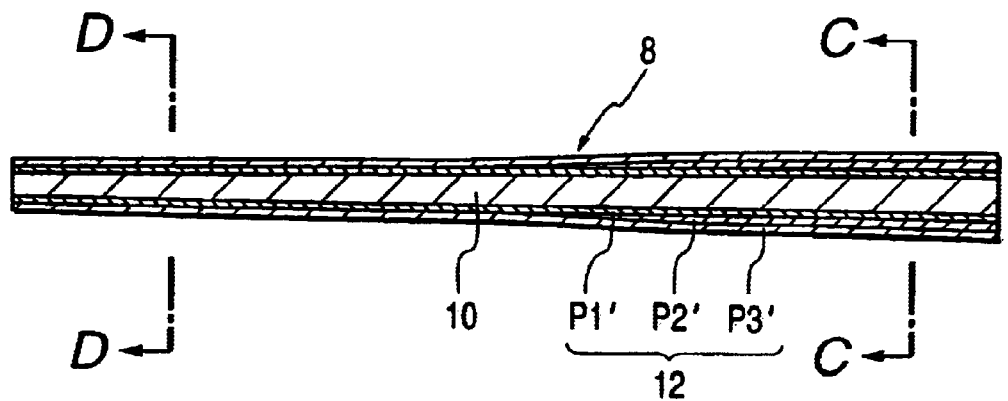
FIG. 2 is a longitudinal section view of a first embodiment of a sporting rod member manufactured according to the method shown in FIG. 1.

FIG. 1 shows a method for manufacturing a sporting rod member such as a fishing rod or the like according to the invention, and FIG. 2 shows a solid rod 8 as a rod member which is manufactured according to the method shown in FIG. 1. FIG. 3(c) is an enlarged transverse section view taken along the arrow line C—C shown in FIG. 2, and FIG. 3(d) is an enlarged transverse section view taken along the arrow line D—D shown in FIG. 2. The solid core member 10 has a forwardly tapered shape and is formed of fiber reinforced resin; and, in the fiber reinforced resin, the matrix thereof is formed of synthetic resin such as epoxy resin or the like and is reinforced with reinforcing fibers such as carbon fibers or the like. To manufacture the solid core member 10, the fiber reinforced resin is previously molded by heating and, after then, generally, the outer periphery thereof is worked by grinding (by cutting) into the forwardly tapered shape or the like.

In particular, three kinds of prepregs P1, P2 and P3 are wound sequentially around the outer periphery of the core member 10 and, after then, if the core member 10 with the prepregs P1, P2 and P3 wound around on the outer periphery thereof is molded by heating while pressurizing the same, then there can be formed a solid rod 8 shown in FIG. 2. Here, layers P1', P2' and P3' correspond to the prepregs P1, P2 and P3 respectively. In the present embodiment, the prepreg P1 includes as the lining thereof a reinforcing fiber S2 which extends substantially in the circumferential direction thereof, and the remaining portions of the prepreg P1 are composed of a reinforcing fiber S1 which extends substantially in the axial direction thereof. And, most of the reinforcing fiber of the prepreg P2 is a reinforcing fiber S3 which extends substantially in the axial direction thereof. Also, the prepreg P3 includes not only a first reinforcing fiber S4 which extends substantially in a 45-degree direction, but also a second reinforcing fiber S4' intersecting at right angles to the first reinforcing fiber S4 (that is, extending substantially in a direction symmetrical with the extending direction of the first reinforcing fiber S4 with respect to the axial direction thereof). In the drawings, the right side is the base end side that is located near the hand of an operator; and, generally, the reinforcing fiber S3 of the prepreg P2 is so selected as to have a larger longitudinal elastic modulus than that of the reinforcing fiber S1 of the prepreg P1.

Differently from the above-mentioned embodiment, the winding order of the respective prepregs may be changed. However, the more outwardly the prepreg 3 is situated, the better. Also, any one of these prepregs may be used to form an outer layer 12. Further, although the numbers of windings of the respective prepregs are arbitrary, if the thickness of the prepregs is set of the order of 0.2 mm or less, and the total number of windings is set in the range not less than 12 (preferably in the range of 15 to 30), then the outer layer 12 can be made large in thickness. In case of the fishing rod, it is preferable that at least butt end side of the outer layer is formed by the windings of 12 or more. This reinforces the cut-worked core member 10 to thereby be able to prevent the surface of the core member 10 from tearing when the core member 10 is flexed greatly, that is, the core member 10 can be made higher in strength; and also, because the prepregs are respectively wound in a small-thickness manner, the prepreg layers can be prevented from peeling off from each other. Still further, most preferably, the prepreg winding start and end positions may coincide with each other. However, even if the start and end positions are different, the deviation of the flexure rigidity of the prepregs in the circumferential direction thereof can be minimized because they are small in thickness. And, when the winding end position goes beyond the winding start position, the smaller the difference between them is, the better; and, also when the winding end position does not reach the winding start position, the smaller the difference is, the better.

Also, if the thickness of the outer layer 12 is set larger than the radius dimension of the core member 10, then a fiber ratio is easy to increase, which is preferable because it is easy to make the solid rod 8 finer in thickness as well as higher in rigidity.

When winding prepregs having different thicknesses around the core member 10, if the thick prepreg is wound inside, then the deviation of the flexure rigidity of the prepregs can be prevented when compared with a case in which the winding start and end positions of the thick prepreg are different from each other, because another prepreg is wound in the rear of the winding end position of the thick prepreg previously wound.

In the inside wound prepregs of the outer layer 12 (in the case shown in FIG. 1, prepregs P1 and P2), preferably, a lining layer may be used. In particular, in FIG. 1, in the prepreg P1, there is used the lining layer, that is, the reinforcing fiber S2 which extends in the circumferential direction of the core member 10; and, instead of the reinforcing fiber S2, there may also be used a scrim sheet as the lining layer. When the axially extending reinforcing fiber S1 is carbon fiber, preferably, the lining fiber S2 may be formed of carbon fiber; and, when the lining layer is a scrim sheet, preferably, the scrim sheet may be formed of a glass fiber. Provision of such lining fibers not only can prevent the meandering of the axially extending reinforcing fiber and the waving or shifting of the layers due to shrinkage of the fiber when the core member 10 is molded by heating, but also can facilitate the winding operation of the prepregs.

The longitudinal elastic moduli (which will be hereinafter referred to as elastic moduli) of the respective reinforcing fibers including the core member can be selected arbitrarily in the range of 1–90 ton/mm² (which will also be sometimes referred to as t hereinafter). In the following description, unless specified otherwise, the elastic modulus means that of the axially extending fiber. Also, the techniques to be described hereinbelow may also be used in combination.

Now, if most of the axially extending reinforcing fiber of the core member 10 is composed of a carbon fiber having an elastic modulus of about 40 t or more, the outer layer 12 is composed of a carbon fiber having an elastic modulus set in the range of about 20–40 t (however, the outer layer 12 may also be formed higher in strength), and the number of windings of the base end side of the outer layer 12 is set in the range of 15–30, then there can be produced a high-strength rod member such as a fishing rod or the like which is fine and tough. Here, the term "tough" means that, even if the rod member is flexed greatly, it will not be broken and the deformed state of the rod member can return gradually back to its original state at a slow speed.

Even if the elastic moduli of the core member and outer layer are reversed, there can also be produced a high-strength rod member which is fine and tough for the high flexure rigidity (which is the same in the meaning as the term "rigidity") thereof.

If the elastic moduli of the reinforcing fibers of the core member and outer layer are set substantially equal to each other (in particular, the difference between the two elastic moduli is within 15% or so) and are selected in the range of 35–60 t or in the range of 16–36 t, then not only the blank material of the core member and outer layer can be prevented against bending when they are molded by heating, but also the prepregs can be prevented from peeling off from each other.

When a carbon fiber is used, if the inside layer of the outer layer 12 is so set as to have a high elastic modulus of 50 t or more and the outside layer of the outer layer 12 is so set as to have a relatively low elastic modulus (in the range of 20–40 t), then the more outside portion of the outer layer is, the higher the strength is, which makes it possible to increase the strength of the product or solid rod further.

In reverse, the outer layer 12 can also be formed in such a manner that the more outside portion of the outer layer 12 is, the higher the elasticity thereof is. In this case, the solid rod can be made to have a high flexure rigidity, so that the solid rod can be made fine in thickness easily.

If the core member 10 is formed in a forwardly tapered shape, the core member 10 is composed mainly of a low elastic reinforcing fiber having an elasticity of 1–16 t, and a prepreg formed of a reinforcing fiber having a higher elastic modulus than the core member 10 is superimposingly wound on the outer layer 12 in such a manner that the outer layer 12 is large in thickness on the base end side thereof (the side that is near the operator's hand), then the solid rod 8 is further easier to flex, thereby being able to provide a better operation property as a rod member, while the base end side thereof can be made higher in strength and rigidity. If a high-strength reinforcing fiber having an elastic modulus of 20–40 t is mixed into the low elastic reinforcing fiber of the core member 10, then the solid rod 8 can be made easy to flex and hard to break. As the reinforcing fiber of the prepreg used for the outer layer 12, there can be used a fiber having an elastic modulus of 10–19 t and having a tensile strength of 350 kg/mm² or more, or, a high-strength reinforcing fiber having an elastic modulus of 20–40 t.

If the outer layer 12 is formed such that the ratio of a highly elastic reinforcing fiber thereof increases as it approaches the base end side thereof, then the outer layer 12 can be made further finer in thickness and lighter in weight.

Because synthetic resin does not contribute to flexure rigidity so much, if the ratio of synthetic resin is set smaller in a highly elastic reinforcing fiber area, then the outer layer 12 can be made still further finer in thickness and lighter in weight. On the other hand, if the ratio of synthetic resin is set large in the highly elastic reinforcing fiber area (for example, if the ratio of synthetic resin in the most highly elastic area is set in the range of 30–50 wt % and the ratio of synthetic resin in the remaining areas is set smaller than the percentage in the most highly elastic area), then it is possible to prevent peel-off between the fibers as well as between the layers when the solid rod 8 is flexed greatly.

When there is formed, in the outer-most layer of the outer layer 12, a woven cloth layer having a low elastic modulus and a high extensibility, then, even if a layer located inside this woven cloth layer is a highly elastic layer, the surface of the outer layer 12 can be prevented against peel-off and tear. As the material of the woven cloth layer, for example, there can be used a glass fiber, polyetherimid (PEI), a carbon fiber having an elastic modulus of 26 t or less, or the like. In particular, it is preferable that a tip end side of a fishing rod is provided with such an outer-most layer of the outer layer 12 as to be formed with the woven cloth layer having a low elastic modulus and a high extensibility.

In both of the core member 10 and outer layer 12, in the area in which the reinforcing fiber is so arranged as to extend substantially in the axial direction thereof, if all of the arranged fibers are composed of carbon fibers, then there can be minimized a difference between the coefficients of linear expansion of the fibers because they are the same kinds of fibers, which makes it possible to prevent the blank materials of the core member 10 and outer layer 12 from bending when they are molded by heating.

If the core member 10 and outer layer 12 are molded by heating after a synthetic resin film or a rubber material film is wound between the core member 10 and outer layer 12 or after synthetic resin such as elastomer resin or the like is coated on the outer periphery of the core member 10, then the boundary layer provides a stress easing layer, so that, even if the solid rod 8 is flexed greatly, not only peel-off between the layers can be prevented and thus the solid rod 8 becomes hard to break but also, as the pole rod, the rod member 8 can provide a soft condition. By the way, the present boundary layer is formed of material which is higher in the extensibility than both of the core member 10 and outer layer 12.

At a proper position in either of the core member 10 or outer layer 12, there is disposed a layer formed of a reinforcing fiber which extends in an inclined direction; preferably, the layer may be structured such that two kinds of reinforcing fibers are so disposed as to extend intersectingly in two inclined directions symmetric with each other with respect to the axial direction of the layer. As the inclination angle, preferably, there may be employed an angle of 45 degrees or so; in more particular, the inclination angle may be in the range of 45 degrees±15 degrees. This can enhance the torsional strength and torsional rigidity of the solid member 8. Also, if there is disposed a layer in which a reinforcing fiber extends substantially in the circumferential direction of the solid rod 8, then the torsional strength and torsional rigidity of the solid member 8 can be enhanced due to combination with the axially extending layer. Preferably, as the circumferentially extending layer, there may be used a woven cloth layer or a bag-net knitted layer. Preferably, if such layer is disposed on the outer-most side of the outer layer 12, then the torsional strength and torsional rigidity of the solid member 8 can be enhanced effectively.

If the ratio of synthetic resin in the core member 10 is set high and the ratio of synthetic resin in the outer layer 12 is set low, then the toughness of the solid rod 8 can be increased when compared with a case where the synthetic resin ratios are set in reverse. This can also be understood from the study of the structure of natural bamboo. The natural bamboo is tough because the bamboo material contains a large quantity of fibers on the outside thereof and a small quantity of fibers on the inside thereof. That is, similarly to the bamboo material, a large quantity of synthetic resin is contained in the inside of the solid rod 8, while a small quantity of synthetic resin is contained in the outside of the solid rod 8. Further, if the outer layer 12 is so formed that the synthetic resin ratio thereof increases as it approaches the more outer side layer thereof, then the fluid-state synthetic resin material is able to push out air bubbles to the outside sufficiently when the outer layer 12 is molded by heating, thereby leaving no air bubble traces on the surface of the outer layer 12, which makes it possible to prevent the outer layer 12 from breaking in and from the air bubble trace portion thereof. As the large resin ratio, for example, there is available 40 wt % or more, or 30 wt % or more.

If the synthetic resin ratio in the low elastic reinforcing fiber layer, that is, the synthetic resin ratio in the whole of the low elastic reinforcing fiber layer including the core member and outer layer is set large, then the rigidity of the solid rod decreases accordingly and thus the solid rod is easier to flex. As the large resin ratio, for example, there is available 45 wt % or more, or 35 wt % or more. When the synthetic resin ratio in the core member is set small, the synthetic resin ratio can also be set about 28 wt % or more.

Figure 4:
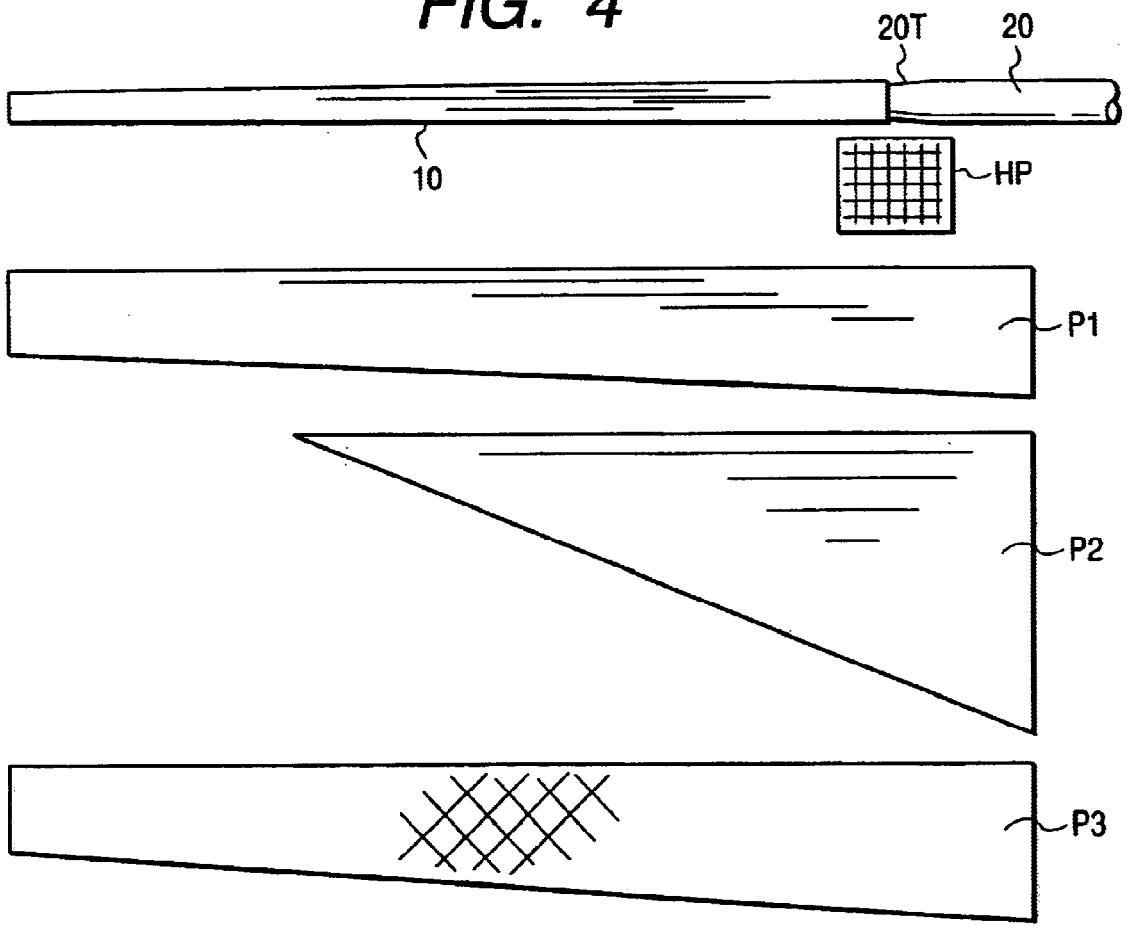
FIG. 4 is an explanatory view of a method for manufacturing a second embodiment of a sporting rod member according to the invention.
Figure 5:
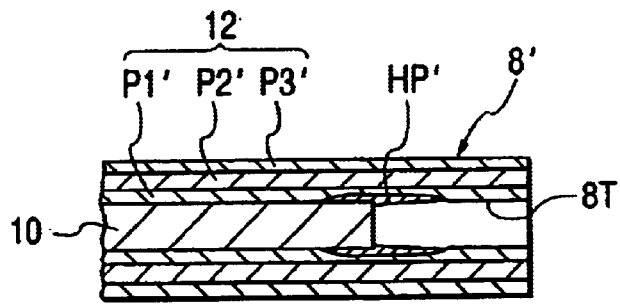
FIG. 5 is a partial section view of the sporting rod member manufactured according to the method shown in FIG. 4.

Now, FIG. 4 shows a method for manufacturing a sporting rod member according to a second embodiment of the invention in which, as shown in FIG. 5, when forming a joint portion 8T in the rear end portion of a solid rod 8', the joint portion 8T is formed integrally with the outer layer 12 of the core member 10 using the prepregs that are wound around the core member 10 as the outer layer 12. Similarly to FIG. 1, the front end face of a core metal 20 is contacted with the rear end face of a previously molded solid-state core member 10. The outer periphery 20T of the front end portion of the core metal 20 is formed in a forwardly tapered shape having a smaller diameter than that of the rear end face of the solid-state core member 10. A reinforcing prepreg HP such as a woven cloth or the like is wound over the rear end portion of the solid-state core member 10 and the front end portion 20T of the core metal 20 and, after then, the prepregs P1, P2 and P3 are wound respectively. In particular, the prepregs P1 and P2 are respectively formed in such a manner that the reinforcing fibers thereof extend substantially in the axial direction of the solid-state core member 10, whereas the prepreg P3 is formed in a bag-net-knitted shape which extends in an inclined direction with respect to the axial direction of the core member 10.

Similarly to the embodiment shown in FIG. 1, in order that the prepregs P1 and P2 can include reinforcing fibers extending in the circumferential direction of the core member 10, for example, there may also be formed linings in the prepregs P1 and P2. The prepreg P3 may be composed of two arranged sheets which cross and overlap with each other in such a manner that they are symmetrical with each other with respect to the axial direction of the core member 10, or may be composed of a prepreg in which a reinforcing fiber extends in the circumferential direction of the core member 10. Referring to the structure of the core member 10, a portion of the core member 10 starting from the base or rear end thereof up to the intermediate portion thereof is formed substantially straight, and the front portion of the core member 10 is formed in a forwardly tapered shape; and, the tapered portion is worked by grinding or by similar means and the-reinforcing fiber thereof is cut. Therefore, if the prepreg P1 is coated on the core member 10 up to the front end thereof as shown in FIG. 4, then it is possible to prevent the core member 10 against breakage that could result from tear or crack. However, the core member 10 may also be structured such that the leading end portion thereof is exposed. If exposed so, then the core member 10 is reduced in diameter and thus it can be flexed more easily.

Figure 6:
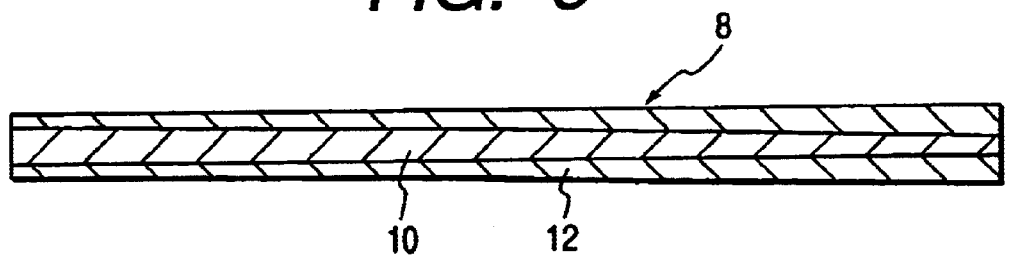
FIG. 6 is a longitudinal section view of a third embodiment of a sporting rod member according to the invention.

Now, FIG. 6 shows a solid rod 8 according to a third embodiment of the invention. In this embodiment, the core member 10 is structured such that the base end side thereof is small in diameter, whereas the front side thereof is large in diameter; that is, the core member 10 is formed in a backwardly tapered shape. And, the outer layer 12 is structured such that the base portion thereof is large in thickness, whereas the front portion thereof is small in thickness. As a whole, the solid rod member 8 is formed in a forwardly tapered shape. In the present embodiment, if a fiber having a high elastic modulus is used in the outer layer 12 and a reinforcing fiber having lower elastic modulus than the outer layer 12 but having a high strength (20–40 t) is used in the core member 10, then there can be obtained a solid rod member 8 of a type that not only the front portion thereof is easy to flex greatly and high in strength but also the base portion thereof is high in rigidity and firm in the sense of operation. Also, the base portion of the solid rod member 8 requiring large rigidity can be formed fine in thickness, which can contribute to the reduction in the weight of the solid rod member 8, thereby being able to enhance the efficiency of the operation of the solid rod member 8.

In reverse, if a fiber having a high elastic modulus is used in the core member 10 and a reinforcing fiber having a low elastic modulus but high in strength (20 t–40 t) is used in the outer layer 12, then there is obtained a solid rod member 8 of a type that the base portion thereof is easy to flex effectively and is high in strength and the front side thereof can be made fine in thickness and lighter in weight: that is, if a rod is made of this solid rod member 8, then the rod will not give a user a sense of heavy weight in carriage, but can give a sharp sense of operation.

In FIG. 6, the tapered state of the core member 10 is set constant. However, this is not limitative but, for example, the tapered state of the core member 10 can also be changed in the intermediate portion thereof or can also be changed in a stepped manner.

Figure 7:
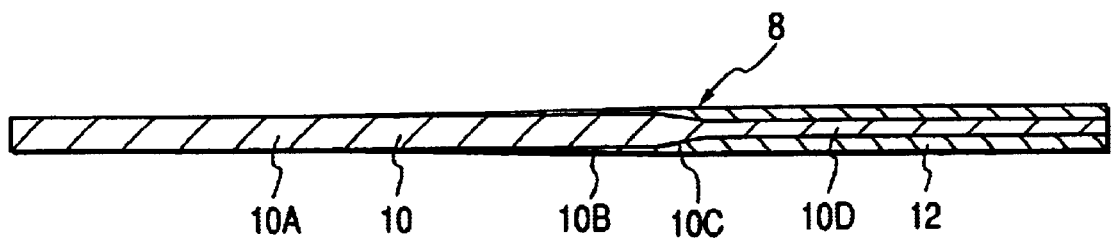
FIG. 7 is a longitudinal section view of a fourth embodiment of a sporting rod member according to the invention.

Now, FIG. 7 is a section view of a sporting rod member according to a fourth embodiment of the invention. In the present embodiment, a core member 10 is composed of a small-diameter portion 10D arranged on the base end side thereof, an increased-diameter portion 10C, a forwardly widened portion 10B, and a forwardly tapered portion 10A. And, the base end portion of a solid rod 8, on which an outer layer 12 is formed except for the forwardly tapered portion 10A, is tapered with a taper ratio of 3/1000 or less or is formed straight; that is, the solid rod 8 is formed in a forwardly tapered shape as a whole. However, the shape of the solid rod 8 may be selected arbitrarily and there may be formed an expansion portion in the intermediate portion of the solid rod 8. In the illustrated embodiment, the small-diameter portion 10D is formed smaller than the smallest portion of the forwardly tapered portion 10A. If a reinforcing fiber having a higher elastic modulus (for example, 35–90 t) than that of the core member 10 is used in the outer layer 12 and a reinforcing fiber having a lower elastic modulus and a higher strength (1–50 t) than the outer layer 12, then there can be obtained a similar effect to the embodiment shown in FIG. 8.

Figure 8:
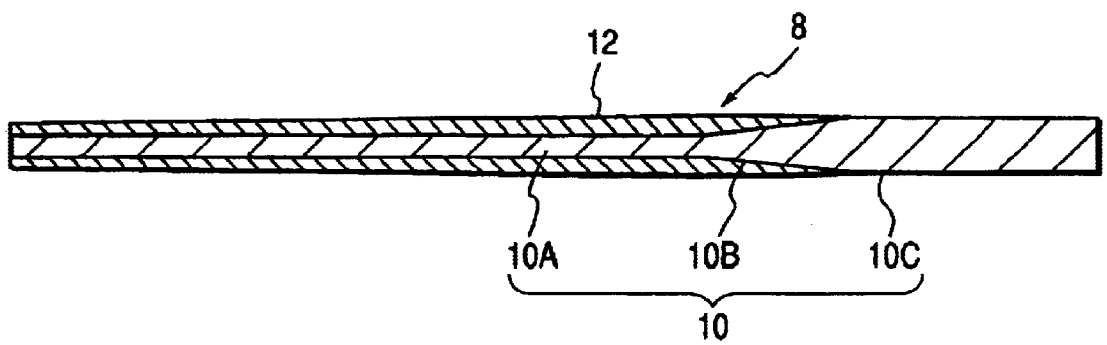
FIG. 8 is a longitudinal section view of a fifth embodiment of a sporting rod member according to the invention.

Now, FIG. 8 shows a longitudinal section view of a sporting rod member according to a fifth embodiment according to the invention. In the present embodiment, a solid rod 8 is composed of a core member 10 and an outer layer 12. In particular, the core member 10 is composed of a straight-shaped portion 10C arranged on the base side thereof, a reduced-diameter portion 10B located in front of the straight-shaped portion 10C, and a straight-shaped or a slightly tapered portion 10A formed in front of the reduced-diameter portion 10B; and, the outer layer 12 is formed of a prepreg wound around the core member 10 except for the straight-shaped portion 10C. Preferably, the straight-shaped portion 10C may be used as the fitting portion of a part such as a gripping member or the like. If a reinforcing fiber having a higher elastic modulus than that of the core member 10 is used in the outer layer 12, then the solid rod 8 can be made finer in thickness and lighter in weight, resulting in the enhanced efficiency of the operation of the solid rod 8. In reverse, if, in the outer layer 12, there is used a high-strength reinforcing fiber having an elastic modulus in the range of 20–40 t which is lower than that of a reinforcing fiber used in the core member 10, there can be produced a solid rod which is high in toughness. By the way, the outer layer 12 maybe formed over the whole length of the core member 10, or not only the base-side straight-shaped portion 10C but also the portion of the solid rod 8, which is located forwardly of the straight-shaped portion 10C, may also be exposed.

Figure 9:
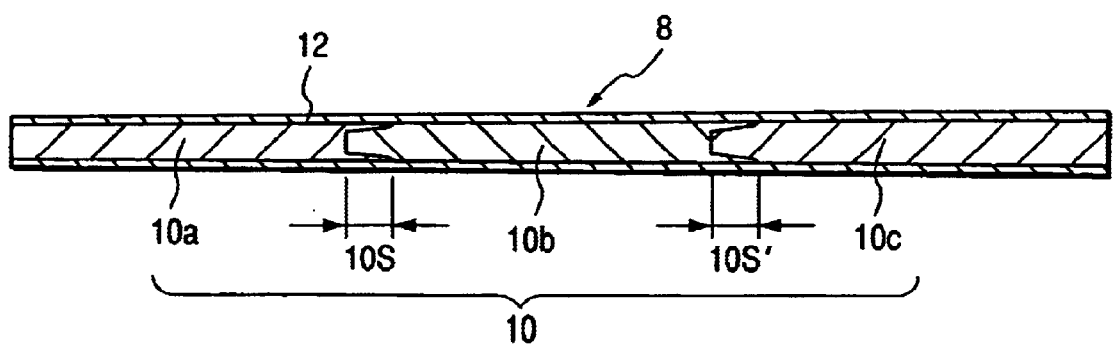
FIG. 9 is a longitudinal section view of a sixth embodiment of a sporting rod member according to the invention.

Now, FIG. 9 shows a sporting rod member according to a sixth embodiment of the invention. In the present embodiment, a solid rod 8 is composed of a core member 10 and an outer layer 12 disposed on the outer periphery of the core member 10. In more particular, in FIG. 9, a first core element 10a, a second core element 10b and a third core element 10c, which are arranged in this order from the top of the solid rod 8, are jointed together to thereby form the core member 10. In the first, second and third core elements, the elastic moduli of reinforcing fibers respectively used therein and extending in the axial direction thereof, or the longitudinal elastic moduli of the three core elements materials are so set as to increase in this order. Due to this, in the more forward portion (in the illustrated embodiment, the more left portion) of the solid rod 8, the more easily the solid rod 8 can be flexed; and, in the more rearward portion of the solid rod 8, the higher the flexure rigidity thereof can be made. That is, it is easy to obtain a rod member of a type that a forward portion thereof can be operated conveniently. Also, if the elastic modulus of the core element on the base side of the core member 10 is set in a high-strength range of (20–40 t), then the strength of the solid rod 8 can be stabilized even if the base portion thereof is flexed greatly. By the way, in reverse, if the elastic modulus of the neighboring portion of the base portion of the core member 10 is set in a high-strength range (20–40 t) and the thickness of the base portion of the outer layer 12 is set large, then the forward portion of the solid rod 8 can be made small in diameter and thus can be operated sharply, while the base portion of the solid rod 8 can be stabilized in strength.

In the above embodiment, the elastic modulus is changed in the three stages. However, this is not limitative but, for example, the elastic modulus can also be changed in two stages or in four or more stages. Further, the elastic modulus may also be changed from the front side of the outer layer 12 to the base side thereof, or the thickness of the outer layer 12 maybe changed from the front side thereof to the base side thereof.

Also, referring to the structure of a joint portion 10S between the core elements 10a and 10b as well as the structure of a joint portion 10S' between the core elements 10b and 10c, they are structured such that the front and rear core elements are changed gradually. That is, for example, in the joint portion 10S, the rear end portion of the core element 10a is a frustum-shaped hole in which the wall portion thereof decreases gradually in thickness in the backward direction thereof, whereas the front end portion of the core element 10b reduces in diameter forwardly in a frustum-shaped manner. Therefore, the joint portion 10S relieves a sudden change in the flexure rigidity corresponding to the difference between the front and rear elastic moduli, so that not only the flexure curve of the solid rod 8 can be made smooth but also the concentration of the stresses in this portion can be prevented, thereby being able to enhance the strength of the solid rod 8. Further, since the present joint structure does not vary in the angular position around the center axis of the solid rod 8, the flexure rigidity in the angular position is prevented against deviation, with the result that the solid rod 8 is easy to use. The method for manufacturing the present solid rod 8 is substantially similar to the method previously described with reference to FIG. 1, except for the above-mentioned structure of the core member 10.

Figure 10:
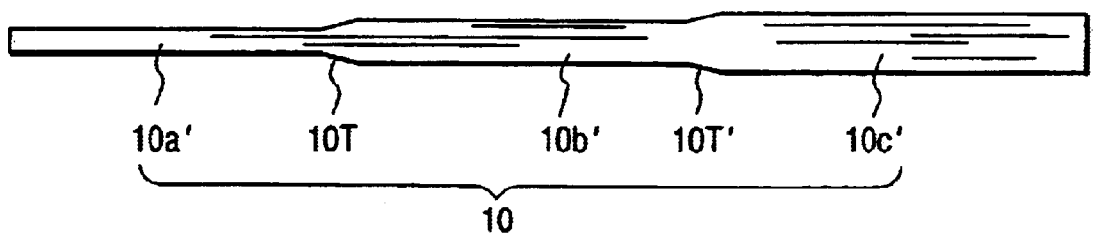
FIG. 10 is a side view of another embodiment of a core member according to the invention.

Now, FIG. 10 shows another embodiment of a core member which is used to be able to obtain a similar flexure characteristic to the solid rod shown in FIG. 9. In particular, the present core member 10 is composed of a large diameter portion 10c', a medium diameter portion 10b' and a small diameter portion 10a', which are respectively connected together by a reduced-diameter portion 10T' and 10T. Even if reinforcing fibers having the same elastic modulus are used in the respective portions of the present core member 10, there can be obtained a similar flexure characteristic to the solid rod 8 shown in FIG. 9. However, if the elastic moduli of the large diameter portion 10c', medium diameter portion 10b' and small diameter portion 10a' are decreased sequentially in this order, then the forward portion of the resultant core member can be made easier to flex. As this is a core member 10, a prepreg may also be disposed on the outer surface of the present core member 10 to thereby provide a solid rod with an outer layer (that is, an outer layer that is formed by the prepreg wound around the outer surface of the present core member 10).

Figure 3:
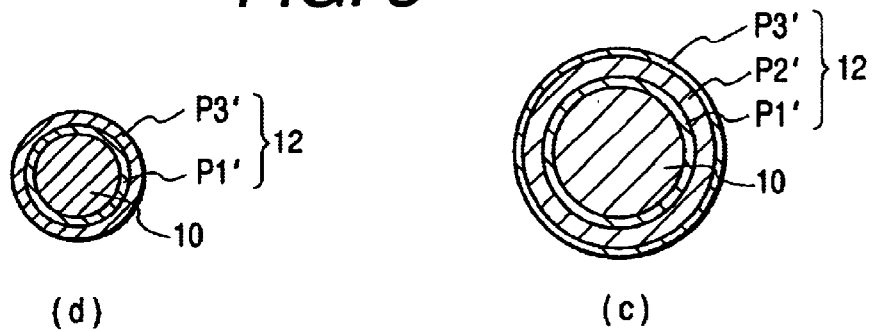
FIG. 3C and 3D are transverse section views taken along the arrow lines C—C and D—D shown in FIG. 2.
Figure 14:
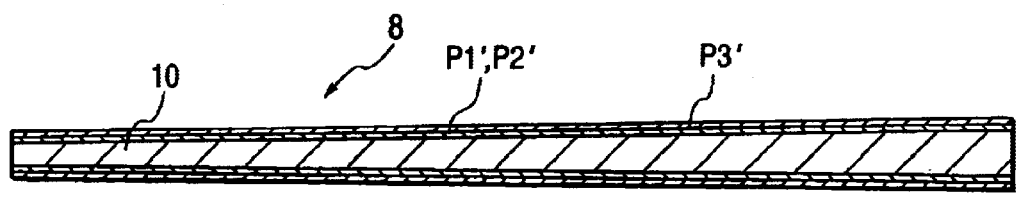
FIG. 14 is a longitudinal section view of a sporting rod member, which is a modification of the first embodiment of the invention.

FIG. 14 shows a sporting rod member using a solid rod, which is a modification of the first embodiment shown in FIGS. 1 to 3. Similarly to the first embodiment, the solid rod 8 comprises a solid-state core member 10 and an outer layer constructed by three layers P1', P2' and P3'. The material and construction of the core member 10 in this modification are the same as those of the core member 10 in the first embodiment. The longitudinally directed fiber reinforced layers P1' and P2' in this modification are formed respectively from the same prepregs P1 and P1 in the same manner as in the case of the first embodiment. The number of windings of the prepreg P1, P2, the thickness of the layer P1', P2', or the like in this embodiment are the same as those of the first embodiment. As each of the prepregs P1, and P2, a prepreg in which reinforcing fibers are directed and aligned in one direction, or a prepreg onto which a scrim sheet or a perpendicularly directed fiber sheet is attached may be used similarly to the first embodiment.

A difference of this modification from the first embodiment is the third layer P3' which is formed from an elongated web-like prepreg having a narrow width of 3–20 mm and a thickness of 0.01–0.20 mm. The web-like prepreg of fiber-reinforced synthetic resin is spirally wound around the longitudinally directed fiber reinforced resin layer P2' or the wound prepreg P2 to form the layer P3'. The layer P3' may be formed by spiral turns of a single web-like prepreg, or otherwise may be formed by spiral turns of two web-like prepregs which are spirally wound in the opposite directions one on the other to intersect with each other. The fibers in the web-like prepreg thus wound are directed at an angle, 45 degree±30 degree (preferably 45 degree±20 degree), with respect to the longitudinal direction of the core member 10. This layer P3' makes the solid rod 8 to bear against a larger bending as well as increases the torsional rigidity of the solid rod 8. The synthetic resin content of the web-like prepreg is set to be 5–60% by weight, preferably 20–50% by weight. As reinforcing fibers contained in the web-like prepreg, carbon fibers having a longitudinal elastic modulus of 1–90 ton/mm$^2$ or higher can be used. Alternatively, glass fibers, aramide fibers, synthetic resin fibers or the like may be used. Although it is preferable that the layer P3' which is the feature of this modification is formed as an outermost portion of the outer layer, the layer P3' may be interposed between the layer P1' and P2', or formed as the innermost portion of the outer layer. In the latter case, the web-like prepreg is directly wound on the outer surface of the core member 10. It is also preferable that the resin content of the web-like prepreg is set to be larger than the resin content of the longitudinally directed fiber reinforced prepreg forming the layer P1' or P2' with which the layer P3' is contacted. This makes it possible to prevent the formation of space between fibers as well as the peeling or separation at the interface. From the viewpoint of increasing the torsional rigidity, it is preferable to use reinforcing fibers which is higher in a longitudinal elastic modulus than the reinforcing fibers used in the core member 8 or the longitudinally directed fiber reinforced layer P1, P2.

To constitute the layer P3', a single web-like prepreg may be spirally wound with a gap between sides of adjacent turns. In this case, the lower layer P2' can be visually exposed through the gap between the sides of adjacent turns of the web-like prepreg (or the layer P3'), so that an aesthetic appearance can be applied to the sporting rod member. The web-like prepreg may be changed from the lower layer P2' in color of resin, kind and direction of contained fibers or the like to form a certain pattern or to provide an aesthetic appearance in cooperation with the lower layer P2'. In case where the two or more web-like prepregs are used to form the layer P3', one or more of the web-like prepreg(s) may be spirally wound with a gap between sides of adjacent turns through which a lower layer of the spirally wound prepreg and/or the lower layer P2' can be visually exposed, thereby improving an aesthetic appearance of the sporting rod member.

As the materials of the core members used in the respective embodiments shown in the above figures, there can be used fiber reinforced synthetic resin (as a reinforcing fiber for this, there are available inorganic and organic fibers such as a glass fiber, a carbon fiber, a boron fiber, an alumina fiber, an aramide fiber, a metal fiber and the like), synthetic resin material, metal material, and natural material (wood, bamboo and the like). By the way, when the core member is formed of material which cannot be closely contacted well with the prepreg of the outer layer, for enhancement of the close contact property of the core member material, the surface of the core-member material may be surface treated; for example, the surface of the core member material may be roughened, or a film may be coated on the surface of the core member material. Referring here to the elastic modulus of the reinforcing fiber of the prepreg of the outer layer, for example, in a carbon fiber, the elastic modulus thereof may be in the range of 1–90 t. And, in order to prevent the blank material from being bent when it is molded by heating, preferably, the same kind of fiber, for example, only the carbon fiber maybe used. However, this is not limitative but other material can also be used arbitrarily.

In the above-described respective embodiments of the invention, the following relative density conditions can be added, or the following relative density conditions can be added regardless of the elastic moduli of the fibers used in the respective embodiments. That is, (1): the relative density of the core member is set smaller than that of the outer layer to reduce the weight of the solid rod, thereby enhancing the efficiency of the operation of the solid rod; (2): the relative density of the material of the forward portion of the core member is set smaller than that of the material of the base side portion thereof to thereby eliminate the heavy feeling of the solid rod in carriage; and, (3): in order to adjust the operation balance and weight balance of the solid rod, in the specific range of the solid rod in the longitudinal direction thereof, or at the specific position of the solid rod in the diameter direction thereof, there is used a material having a relative density different from that of the remaining portions of the solid rod (preferably, as a member having a large relative density, there may be used a member having a relative density of 8 g/cm$^3$ or more).

In the above-described respective embodiments of the invention, if the portion of the solid rod using a reinforcing fiber having a higher elastic modulus is set such that the rate of synthetic resin thereof is smaller, then there can be obtained a solid rod which is higher in elasticity, is more tightly strung, and is lighter in weight. Also, when an outer layer exists, if the synthetic resin ratio of the core member is set smaller than that of the outer layer, for example, a value of 28 wt % or less, then there can be obtained a solid rod which is lighter in weight, finer in thickness, and is improved in the efficiency of the operation thereof. Further, if the synthetic resin ratios of the core member and outer layer are set approximate to each other, then the resultant solid rod can be easily prevented against peel-off and damage that otherwise could occur between the layers of the solid rod.

Figure 11:
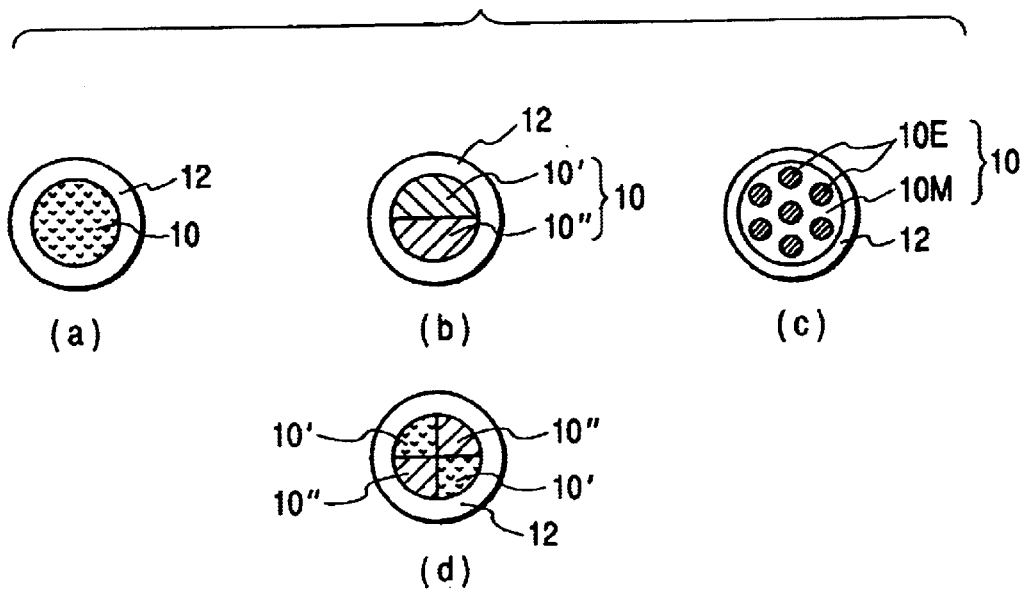
FIGS. 11a, 11b, 11c and 11d are transverse section views of various sporting rod members according to the invention.

Now, FIG. 11 shows several embodiments of a core member 10 used to form a solid rod. In particular, FIG. 11(a) shows a core member 10 which is formed of foaming material; FIG. 11(b) shows a core member 10 composed of two radially-extending core elements 10' and 10" which are respectively formed of materials different in the properties thereof from each other; FIG. 11(c) shows a core member 10 composed of a plurality of reinforcing members 10E, which are formed of a plurality of particles or a plurality of reinforcing fiber bundles, and a base member 10M charged into gaps between the reinforcing members 10E; and, FIG. 11(d) shows a modification of the core member 10 shown in FIG. 11(b). In the modification shown in FIG. 11(d), materials differing in the properties from each other may be used in the quadrisected areas of the core member 10; however, here, one pair of mutually diagonally located core elements 10' and 10' are formed of the same material, while the other pair of mutually diagonally located core elements 10" and 10" are formed of the same material.

In the embodiments shown in FIGS. 11(b) and (d), the flexure properties of the core members vary according to the angular positions thereof (that is, there are produced direction properties). As a core member which produces such direction property, other than the core members (b) and (d), there are available a core member which is composed of a plurality of core elements connected together in such a manner as shown in FIG. 9, and a core member which, differently from the core member shown in FIG. 9, is composed of a plurality of cylindrical-shaped core elements connected together in a diagonally cut manner. That is, in these joint portions, since, similarly to the core metal 10 shown in FIG. 11(b), the two materials extending in different radial directions of the core member face each other, there are produced direction properties.

Further, if a core member is shifted in a solid rod, then there is generally produced a flexure direction property. However, by selecting the elastic modulus of the core member and the elastic modulus of the outer layer as their respective given values, the flexure direction property can be reduced or eliminated.

Figure 12:
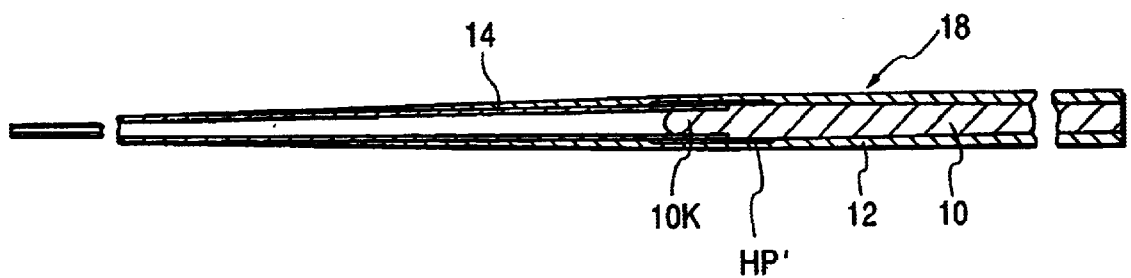
FIG. 12 is a longitudinal section view of a seventh embodiment of a sporting rod member according to the invention.

Now, FIG. 12 shows a fiber reinforced resin sporting rod member 18 in which a hollow pipe member is formed integrally with the front portion of a solid rod. Referring to the procedure for manufacturing the present sporting rod member 18, the outer periphery of a front portion 10K of a previously formed core member 10 is formed as a slightly stepped small diameter portion, and a previously formed pipe member 14 is temporarily secured to the small diameter portion 10K by adhesion or by similar means. A reinforcing prepreg (prepreg similar to HP in FIG. 4) is wound over an area which extends forwardly and rearwardly of such joint portion. In the present embodiment, one or more prepregs are wound over an area which extends from the rear end of the core member 10 up to the intermediate position of the pipe member 14; and, after then, while pressurizing, the prepregs are molded by heating, thereby forming an outer layer 12. The reinforcing prepregs cooperate together to form a reinforcing layer HP'. The prepregs that are used in the outer layer 12 are similar to those previously described with reference to the respective embodiments of the invention shown in FIG. 1 and the like.

The present rod member 18 can be used as a single fishing rod or a node of a joint-type fishing rod.

When using the present rod member 18 as a single fishing rod or a top rod of a joint-type fishing rod, for example, the area of the hollow pipe member 14 and its backward area up to the intermediate position of the solid rod may be formed in a gradually tapered shape having a taper angle of 5/1000, and the remaining area of the rod member 18 extending from the intermediate position of the solid rod up to the rear end of the solid rod may be formed in a straight shape having a taper angle of 1/1000 or less. Also, if the range of the hollow pipe member is set in the range of 30–60% of the whole length of the rod member 18 from the leading end thereof, then a heavy feeling in carriage can be prevented and also the efficiency of the operation can be enhanced.

The above-mentioned core member 10 is formed of a fiber reinforcing resin consisting mainly of axially extending reinforcing fibers. However, this is not limitative but the core member 10 can also be formed of synthetic resin, natural material such as bamboo, wood or the like, metal, or other materials. Also, when an outer layer 12 exists, if the core member 10 is formed of foaming material or low-relative-density synthetic resin having a relative density lower than that of the outer layer, then the rod member 18 can be reduced in weight, thereby being able to provide a rod member for a fishing rod which does not give a heavy feeling in carriage but can be operated with high efficiency.

The range of the outer layer 12 in the longitudinal direction thereof may be selected arbitrarily, for example, it may be limited to the portion of the core member 10, or the outer layer 12 may be omitted.

The pipe member 14, preferably, may consist mainly of a high-strength carbon fiber (an elastic modulus thereof may be set in the range of 20–40 t, or in the range of 20–50 t). Also, if the core member 10 is formed of a fiber having a higher elastic modulus than that of the pipe member 14, then the rod member 18 can be made finer in thickness and lighter in weight. As the prepreg of the outer layer 12, there can be used a reinforcing fiber having an elastic modulus of 20–90 t, or a fiber having a lower elastic modulus than that of the prepreg. When the outer layer 12 is formed of a plurality of prepregs, if the first prepreg is so selected as to have an elastic modulus substantially the same as the axially extending reinforcing fiber of the pipe member 14 or an elastic modulus with a difference of 20 t or less, then the flexing operation of the rod member 18 can be made excellent. This not only can prevent peel-off between the component layers of the rod member 18, but also can distribute the flexing load to the all of the prepreg layers in the diameter direction of the rod member 18, that is, the flexing load can be shared by all prepreg layers, so that the strength of the rod member 18 can be increased accordingly.

Figure 13:
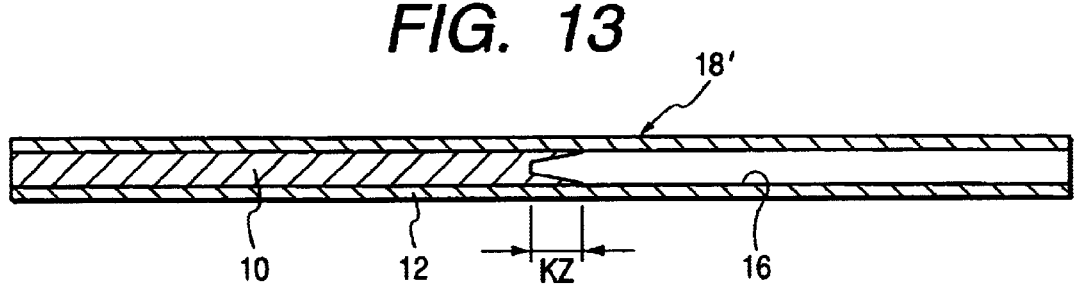
FIG. 13 is a longitudinal section view of an eighth embodiment of a sporting rod member according to the invention.

Now, FIG. 13 is a longitudinal section view of a fiber reinforced resin sporting rod member 181 in which a solid rod and a hollow pipe are formed as an integrally united body. When manufacturing the present sporting rod member 18', similarly to the manufacturing method shown in FIG. 4, the end face of a core metal is contacted with one end of a previously prepared core member 10, two or more desired prepregs are wound on the core metal and core member 10, they are then heated, and, after then, the core metal is removed therefrom. In particular, the outer layer 12 is formed in a range which extends longer than the length of the core member 10, thereby forming a hollow pipe 16. A boundary portion KZ between the solid rod portion and hollow pipe portion is formed in such a state as shown in FIG. 13. Therefore, not only the flexure curve of the rod member 18' is made smooth for the same reason as has been described with reference to FIG. 9, but also the concentration of stresses in the boundary portion KZ can be prevented. Either of the right or left side of the rod member 18' may be set as the head thereof, and the rod member 18' may be tapered in a forward or backward direction. If the outer layer 12 is formed such that it includes reinforcing fibers intersecting each other in an inclined direction in the angular range of 45 deg.±15 deg., then, the rod member 18' can be made strong against torsion, similarly to the previously described embodiments of the invention.

If the surfaces of the sporting rod members according to the above-mentioned respective embodiments are surface treated using a pattern, painting, coating of fluorescent material, plating, dry plating and the like, and a transparent or translucent fiber reinforced synthetic resin layer composed of prepregs is formed on the thus treated surfaces of the sporting rod members, then not only the pattern and the like can be protected but also the appearances of the sporting rod members can be made deep in variously variable manner depending on the thicknesses of the transparent or translucent layer. Further, due to existence of such transparent or translucent layer, the sporting rod member can be made strong and tough against great flexure. And, the transparent or translucent layer may also be formed as an outer layer of each of the above-mentioned embodiments and, in this case, there can also be obtained a similar effect. As the reinforcing fiber of the transparent or translucent layer, there can be used either of a long fiber or a short fiber; in particular, a glass fiber, a quartz fiber, an organic transparent fiber, and the like.

As has been described heretofore, according to the invention, there can be provided a rod member which is strong against flexure, a rod member which is improved in tough and balance when it is flexed, and a rod member which can be made finer in thickness or lighter in weight.

What is claimed is:

1. A sporting rod member using a solid rod, said solid rod comprising:
    a solid-state core member; and
    an outer layer formed of fiber reinforced resin and disposed on an outside of said core member,
    wherein most of reinforcing fibers used in at least one of said solid-state core member and said outer layer and extending substantially in an axial direction thereof have a longitudinal elastic modulus of 40 ton/mm$^2$ or higher.

2. A sporting rod member using a solid rod as set forth in claim 1, wherein said outer layer includes a layer formed from a web-like prepreg spirally wound in an axial direction.

3. A sporting rod member using a solid rod as set forth in claim 1, wherein a total number of windings forming the outer layer is not less than 12.

4. A sporting rod member using a solid rod as set forth in claim 3, wherein the outer layer is formed at least partially from a prepreg having a lining layer attached to longitudinally arranged fibers.

5. A sporting rod member using a solid rod as set forth in claim 1, wherein the outer layer is formed at least partially from a prepreg having a lining layer attached to longitudinally arranged fibers.

6. A sporting rod member using a solid rod as set forth in claim 1, wherein the outer layer is formed such that a ratio of highly elastic reinforcing fibers increases as it approaches a base end side.

7. A sporting rod member using a solid rod as set forth in claim 1, wherein said outer layer includes one of a woven cloth, an inclined-direction extending fiber, and a circumferential-direction extending fiber.

8. A sporting rod member using a solid rod as set forth in claim 1, wherein, one of forming said outer layer and formed on the outside of said outer layer, there is disposed a transparent or translucent fiber reinforced resin layer.

9. A sporting rod member using a solid rod, said solid rod comprising:
    a solid-state core member formed of fiber reinforced resin; and
    an outer layer formed of fiber reinforced resin and disposed on an outside of said core member,
    wherein an average longitudinal elastic modulus of axially extending reinforcing fibers of said core member varies in two or more stages in an axial direction thereof.

10. A sporting rod member using a solid rod as set forth in claim 9, wherein said average longitudinal elastic modulus is higher on a base end side of said core member than on a leading end side thereof.

11. A sporting rod member using a solid rod as set forth in claim 9, wherein said outer layer includes one of a woven cloth, an inclined-direction extending fiber, and a circumferential-direction extending fiber.

12. A sporting rod member using a solid rod as set forth in claim 9, wherein, one of forming said outer layer and formed on the outside of said outer layer, there is disposed a transparent or translucent fiber reinforced resin layer.

13. A sporting rod member using a solid rod as set forth in claim 9, wherein a total number of windings forming the outer layer is not less than 12.

14. A sporting rod member using a solid rod as set forth in claim 9, wherein the outer layer is formed at least partially from a prepreg having a lining layer attached to longitudinally arranged fibers.

15. A sporting rod member using a solid rod as set forth in claim 9, wherein the outer layer is formed such that a ratio of highly elastic reinforcing fibers increases as it approaches a base end side.

16. A sporting rod member using a solid rod, said solid rod comprising:
    a solid-state core member;
    an outer layer formed of fiber reinforced resin and disposed on an outside of said core member; and
    a hollow pipe member formed integrally with an end portion of said solid rod.

17. A sporting rod member using a solid rod as set forth in claim 12, wherein said outer layer includes one of a woven cloth, an inclined-direction extending fiber, and a circumferential-direction extending fiber.

18. A sporting rod member using a solid rod as set forth in claim 17, wherein, as said outer layer, or on the outside of said outer layer, there is disposed a transparent or translucent fiber reinforced resin layer.

19. A sporting rod member using a solid rod as set forth in claim 12, wherein one of, as said outer layer, and on the outside of said outer layer, there is disposed one of a transparent and translucent fiber reinforced resin layer.

20. A sporting rod member using a solid rod as set forth in claim 16, wherein a total number of windings forming the outer layer is not less than 12.

21. A sporting rod member using a solid rod as set forth in claim 16, wherein the outer layer is formed at least partially from a prepreg having a lining layer attached to longitudinally arranged fibers.

22. A sporting rod member using a solid rod as set forth in claim 16, wherein the outer layer is formed such that a ratio of highly elastic reinforcing fibers increases as it approaches a base end side.

* * * * *